United States Patent
Halterman

(10) Patent No.: US 7,319,193 B2
(45) Date of Patent: Jan. 15, 2008

(54) COVER ASSEMBLIES FOR IN-FLOOR FITTINGS

(75) Inventor: Frederick J. Halterman, Cuyahoga Falls, OH (US)

(73) Assignee: Wiremold, Inc., West Hartford, CT (US)

( * ) Notice: Subject to any disclaimer, the term of this patent is extended or adjusted under 35 U.S.C. 154(b) by 0 days.

(21) Appl. No.: 10/553,156

(22) PCT Filed: Apr. 9, 2004

(86) PCT No.: PCT/US2004/011653

§ 371 (c)(1),
(2), (4) Date: Nov. 8, 2006

(87) PCT Pub. No.: WO2004/093278

PCT Pub. Date: Oct. 28, 2004

(65) Prior Publication Data

US 2007/0074890 A1    Apr. 5, 2007

Related U.S. Application Data

(60) Provisional application No. 60/462,280, filed on Apr. 11, 2003.

(51) Int. Cl.
*H02G 3/14* (2006.01)
(52) U.S. Cl. .................. 174/67; 174/66; 174/482; 174/488; 220/241; 220/242
(58) Field of Classification Search .................. 174/480, 174/481, 482, 483, 484, 486, 487, 488, 489, 174/490, 66, 67, 50; 220/3.2, 3.3, 3.4, 3.5, 220/3.6, 3.7, 3.8, 3.9, 4.02, 241, 242; 439/535, 439/536; 248/906
See application file for complete search history.

(56) References Cited

U.S. PATENT DOCUMENTS

| | | | | | |
|---|---|---|---|---|---|
| 4,883,924 | A | * | 11/1989 | Hadfield | 174/482 |
| 5,032,690 | A | * | 7/1991 | Bloom | 174/487 |
| 5,160,808 | A | * | 11/1992 | Hadfield | 174/480 |
| 5,422,434 | A | * | 6/1995 | Wuertz et al. | 174/67 |
| 5,455,388 | A | * | 10/1995 | Pratt | 174/67 |
| 5,627,340 | A | * | 5/1997 | Smith et al. | 174/482 |
| 6,175,078 | B1 | | 1/2001 | Bambardekar et al. | |
| 6,265,662 | B1 | * | 7/2001 | Riedy et al. | 174/67 |
| 6,417,450 | B1 | * | 7/2002 | Young | 174/66 |
| 6,450,353 | B1 | * | 9/2002 | Riedy et al. | 220/3.3 |
| 6,462,277 | B1 | * | 10/2002 | Young et al. | 174/66 |
| 6,545,215 | B2 | * | 4/2003 | Young et al. | 174/490 |
| 6,551,130 | B2 | * | 4/2003 | Bonilla | 174/483 |
| 6,552,262 | B2 | * | 4/2003 | English et al. | 174/50 |
| 6,612,081 | B2 | * | 9/2003 | Cole et al. | 174/66 |
| 7,082,729 | B2 | * | 8/2006 | Cole et al. | 174/66 |
| 7,105,745 | B2 | * | 9/2006 | Drane et al. | 174/67 |

* cited by examiner

*Primary Examiner*—Angel R. Estrada
(74) *Attorney, Agent, or Firm*—McAndrews Held & Malloy, Ltd.

(57) ABSTRACT

Certain embodiments of the present invention provide a cover assembly for an in-floor fitting that includes a trim flange, an access door mounting member, first and second access doors, and a plurality of seal members. A first seal member seals against moisture infiltration between the access doors when the access doors are at their closed positions. A second seal member is interposed between the mounting member and the trim flange to seal against water infiltration between these components. A third seal member is interposed between the trim flange and a floor surface to seal against water infiltration between the trim flange and the floor surface.

27 Claims, 14 Drawing Sheets

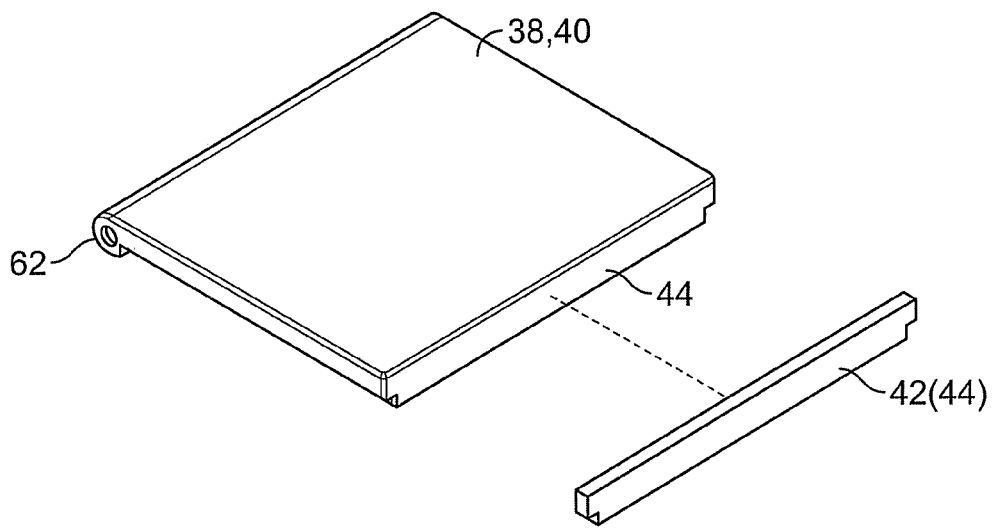
FIG. 8
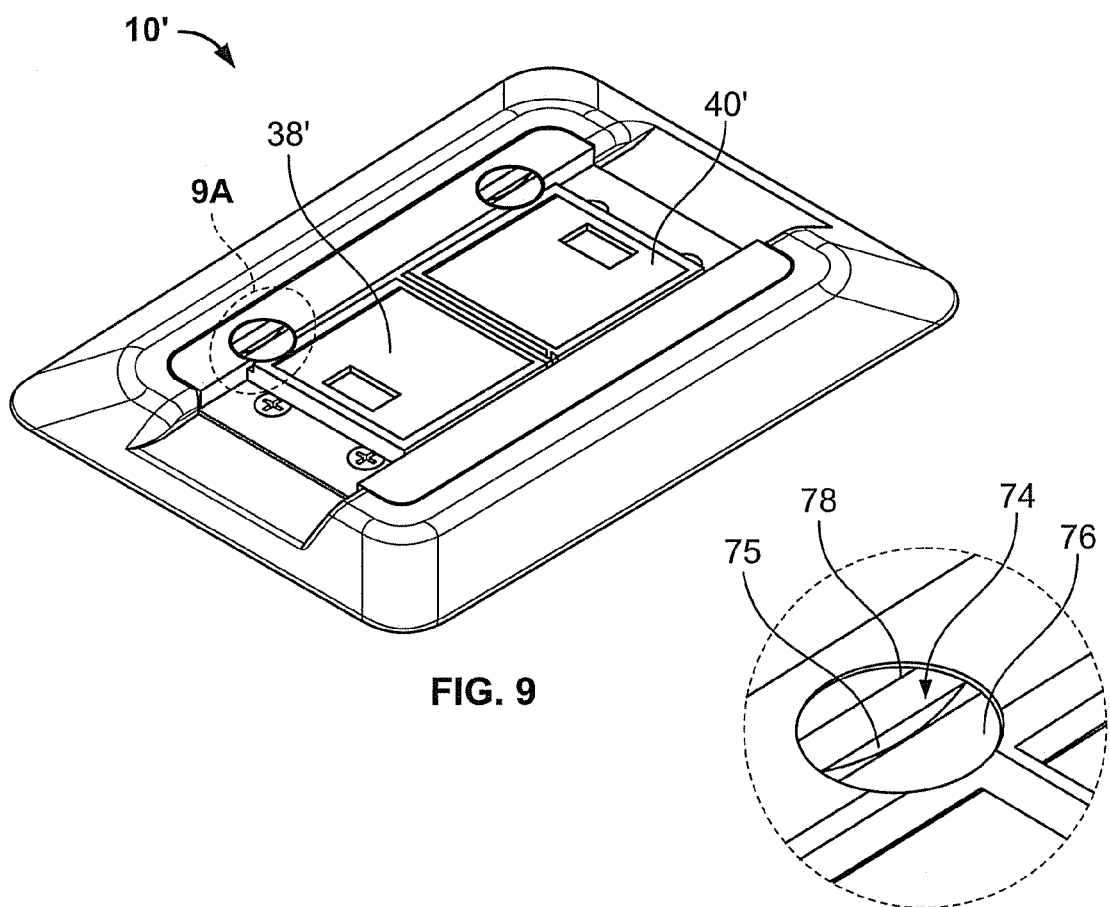
FIG. 9
FIG. 9A

COVER ASSEMBLIES FOR IN-FLOOR FITTINGS

RELATED APPLICATIONS

This application claims priority of Provisional Application Ser. No. 60/462,280 entitled "Cover Assemblies for In-Floor Fittings," filed Apr. 11, 2003, which is hereby incorporated by reference in its entirety.

BACKGROUND OF THE INVENTION

In-floor fittings such as poke-thru fittings, aftersets fittings, and preset fittings are installed in floors, such as concrete floors, to provide electrical receptacles and/or communication/data receptacles (or jacks) at desired locations in buildings. The receptacles in these fittings are typically mounted at or near the surface of the floor. As a result, the receptacles may be exposed to contaminants such as dirt, dust, and water if they are left uncovered when they are not in use. Such contaminants can adversely affect the operating of the receptacles. Hence, it is desirable to provide a cover assembly for such fitting which is designed to cover the receptacles when they are not being used.

BRIEF SUMMARY OF THE INVENTION

According to certain aspects of an embodiment of the invention, a cover assembly for an in-floor fitting comprises a trim flange, an access door mounting member, first and second access doors and a plurality of seal members. The trim flange is connectable to the fitting and has opening that overlies the fitting and provides access to an interior compartment of the fitting. According to one embodiment, the opening of the trim flange is configured to support at least one electrical receptacle, such as a duplex power receptacle. Alternatively, at least one receptacle can be mounted in the fitting and accessed through the opening(s) in the trim flange. The access door mounting member is connectable to the trim flange, and includes an opening that overlies the opening in the trim flange. First and second access doors are connected to the mounting member for movement between closed positions at which the access doors are adjacent one another and overlie the at least one receptacle and open positions at which the access doors are laterally spaced from one another and the at least one receptacle is exposed and accessible from above. A first seal member seals against moisture infiltration between the access doors when the access doors are at their closed positions. A second seal member seals against water infiltration between the mounting member and the trim flange. A third seal member seals against water infiltration between the trim flange and the floor.

According to one embodiment, the at least one electrical receptacle comprises a power receptacle having first and second outlets. In this embodiment each access door is preferably movable between a closed position at which it overlies a respective outlet and an open position at which a respective outlet is exposed and accessible from above.

According to one embodiment the access doors are pivotally connected to the mounting member. In other embodiments, the access doors are slidably connected to the mounting member.

The cover assembly may include a locking mechanism for releasably locking the access doors at their open and closed positions. According to one embodiment, the locking mechanism comprises at least one locking screw carried by the access door mounting member. The locking screw can be rotated between a first position at which the doors are movable between their open and closed positions and a second position which restricts movement of the access doors between their open and closed positions.

According to another embodiment, the locking mechanism comprises first and second ball plungers associated with the first and second doors, respectively. Each ball plunger includes a ball member which interfaces with a surface of a respective access door to releasably lock the door at its open and closed positions. The ball plungers may be mounted in a top surface of the access door mounting member, and each door may include features (such as dimples) in its bottom face that interface with the ball plunger to releasably lock the door at its open and closed positions.

According to another embodiment, the locking mechanism comprises first and second spring members associated with the first and second doors, respectively. The first and second springs are preferably carried by the first and second doors, respectively, and are configured to releasably mate with reciprocal features (such as cutouts) in the access door mounting member for releasably locking the doors at their open and closed positions. Alternatively, the spring members may be carried by the mounting member and interface with features in the doors for reseably locking the doors in their open and closed positions.

According to one embodiment, the first seal member comprises at least one compressible seal carried by at least one of the access doors. Preferably, the compressible seal member comprises a pair of compressible seal members, where each of the compressible seal member is carried by one of the access doors. The compressible seal members are positioned to abut one another when the access doors are at their closed positions so as to seal against moisture infiltration between the access doors. The compressible seal members may comprise a compressible polymer that is co-molded with the access doors. In one embodiment, the access doors have a multi-piece construction, in which case the compressible seals can be compression fit between pieces of a given door to secure the seal member to the door.

Alternatively, the first seal member may comprise at least one magnetic seal member. Preferably, the magnetic seal member comprises first and second magnetic seal members, each of the magnetic seal members being carried by one of the access doors. The magnetic seal members are positioned to magnetically engage with one another when the access doors are at their closed position so as to seal between the access doors.

According to one embodiment, the second seal member comprises a generally planar portion that is compressed between the mounting member and the trim flange. An access opening in the second seal member provides access to the at least one receptacle. An upwardly extending rib formed around the perimeter of the access opening is positioned to abut with the access doors when the access doors are at their closed positions so as to seal against water infiltration between the rib and the doors.

According to one embodiment, the third seal member comprises at least one gasket which is adapted to be compressed between the trim flange and an upper surface of the floor when the trim flange connected to the fitting.

According to certain aspects of another embodiment of the invention, a cover assembly for an in-floor fitting comprises a trim flange, an access door mounting member, an access door movably connected to the mounting member and a plurality of seal members. The trim flange is connectable to the fitting. The trim flange has opening that overlies the fitting and provides access to an interior compartment of the fitting. The opening of the trim flange may be configured to support at least one electrical receptacle. Alternatively, at least one receptacle can be mounted in the fitting and accessed through opening(s) in the trim flange. The access door mounting member is connectable to the trim flange, and includes an opening that overlies the opening in the trim flange. An access door is connected to the access door mounting member for movement between a closed position at which the access door overlie the at least one receptacle and an open position at which the at least one receptacle is exposed and accessible from above. A first seal member seals against moisture infiltration between the access door and the mounting member when the door is at its closed position. A second seal member seals against water infiltration between the mounting member and the trim flange. A third seal member seals against water infiltration between the trim flange and the floor.

BRIEF DESCRIPTION OF SEVERAL VIEWS OF THE DRAWINGS

FIGS. 1 through 8 illustrate certain aspects of a cover assembly according to a first embodiment of the present invention.

FIGS. 9 through 12 illustrate certain aspects of a cover assembly according to a second embodiment of the present invention.

Figure 1:
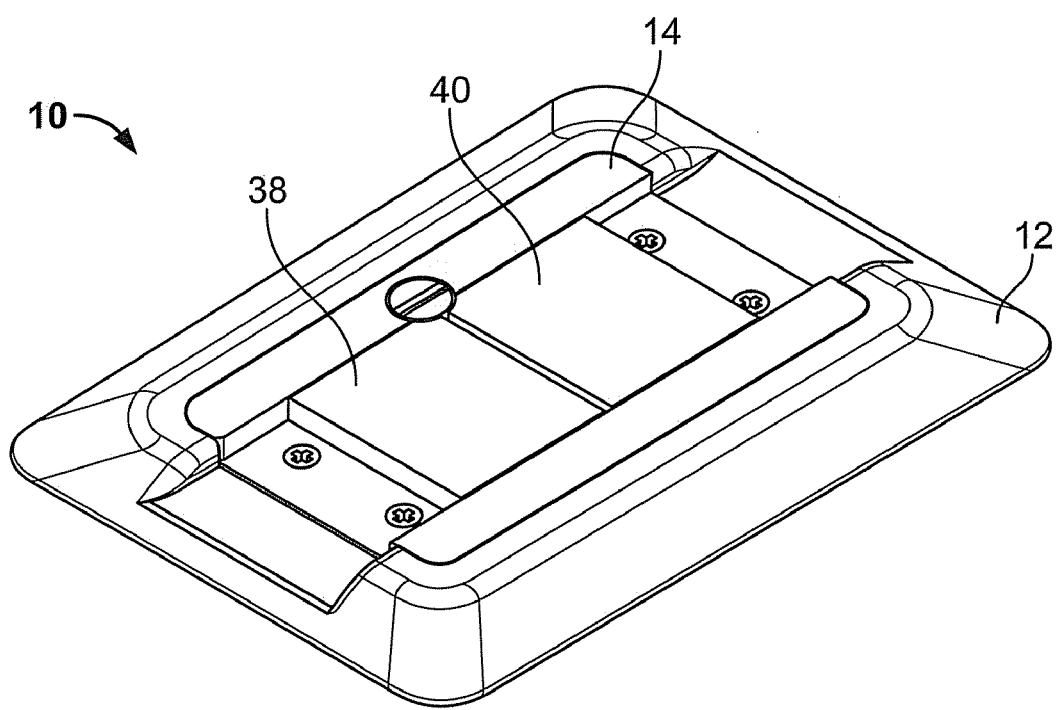
Figure 2:
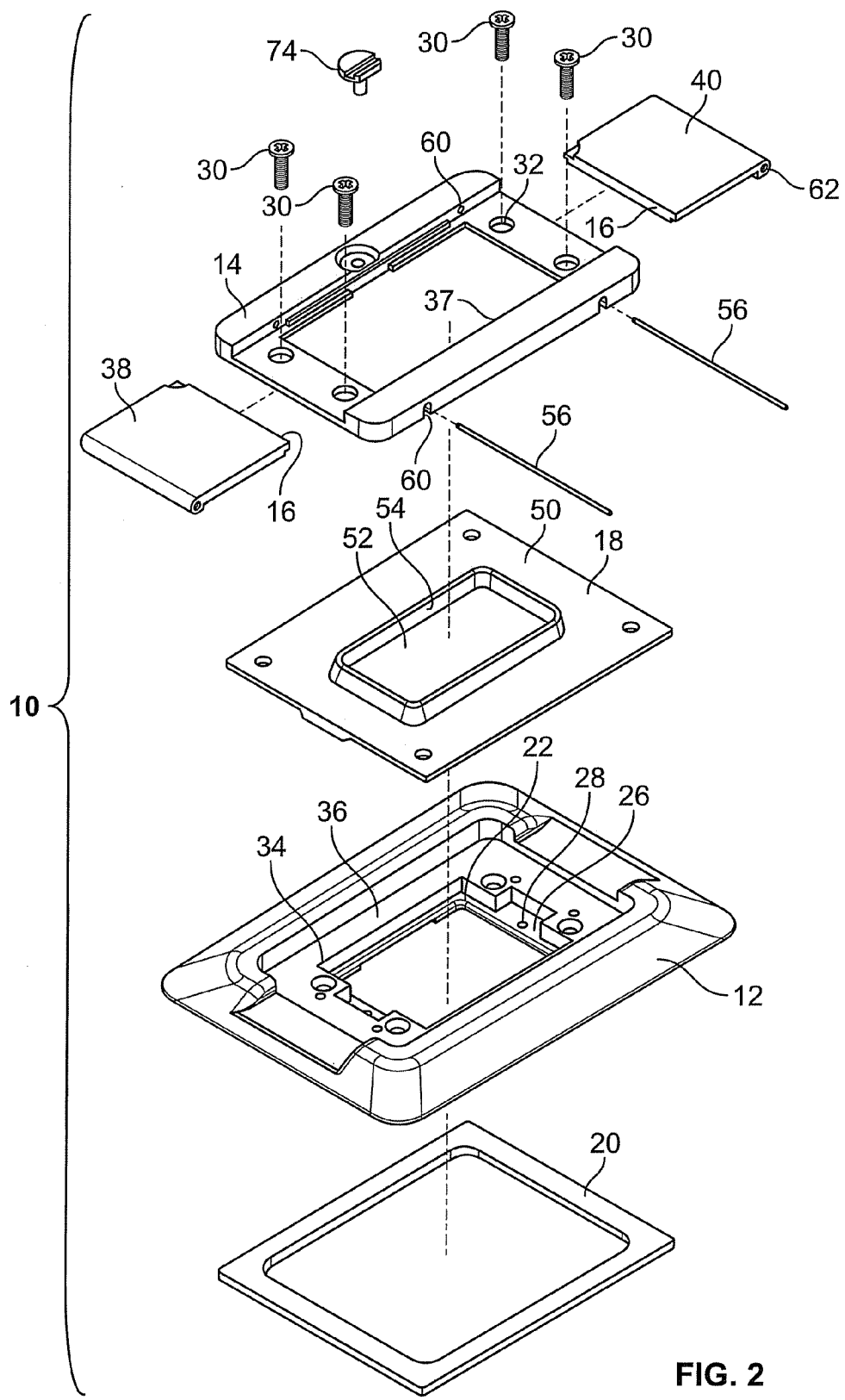

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIGS. 1 through 8 illustrate certain aspects of a cover assembly 10 according to a first embodiment of the present invention. The cover assembly is configured for connection to an in-floor fitting, such a floor box, a preset, an afterset or a poke through fitting. Exemplary in-floor fittings are described in U.S. Pat. Nos. 6,316,725; 6,462,277; 6,545, 215; and 6,552,262, the disclosures of which are hereby incorporated by reference in their entirety.

By way of example, the in-floor fitting may be a preset housing or an afterset housing such as those shown in the aforementioned U.S. Pat. No. 6,316,725 patent (the "725 patent"). The 725 patent describes an underfloor electrical distribution system that includes a plurality of raceway panels that are positioned on a subfloor prior to pouring of the concrete floor. The raceway panels are laid out in accordance with a predetermined pattern to route service cables to desired locations in the building. Each raceway panel consists of a metallic duct having an interior passage for carrying the service cables. In-floor fittings (either presets or aftersets fittings) are connected to the raceway to provide access to the interior passage of the raceway. Each in-floor fitting defines a hollow interior compartment that is interconnectable with the interior passage of the raceway panel to provide access to the service cables that are carried in the raceway panel.

The in-floor fittings illustrated in the 725 patent have generally rectangular housings, which consist of a bottom wall and an upstanding side wall. Although the present cover assembly is described in connection with a rectangular floor fitting, it should be appreciated that the cover assembly could be constructed for use with a circular fitting, such as the poke through fitting of described in the aforementioned U.S. Pat. No. 6,545,215.

The cover assembly of the presents invention is configured to overly the top opening of the in-floor fitting and provide access to the interior compartment of the fitting. Referring to the drawings, and FIG. 2 in particular, the cover assembly 10 comprises a trim flange 12, an access door mounting member 14, a first seal member 16, a second seal member 18, and a third seal member 20. The trim flange 12 is connectable by threaded fasteners (not shown) that pass through apertures in the trim flange and thread into reciprocal threaded openings in the fitting to secure the flange to the fitting. The trim flange 12 includes an opening 22 that overlies the fitting and provides access to interior compartment of the fitting. In the illustrated embodiment, the opening in the trim flange 12 is configured to support an electrical receptacle 24, which is illustrated as a duplex power receptacle (see FIG. 4). Alternatively, the receptacle (s) can be mounted within the fitting, as is described, for example, in the aforementioned U.S. Pat. No. 6,464,277. For this purpose, the trim flange includes recesses 26 at opposite ends of the opening 22. The recesses are configured to receive reciprocal flanges (not shown) formed on the ends of the receptacle 24. Threaded fasteners (not shown) pass through openings in the flanges on the receptacle 24 and into reciprocal threaded openings 28 in the recesses 26 to secure the receptacle to the trim flange 12, in a conventional manner. It will be appreciated that a variety of other mechanisms, such as snap features, can be used to secure the receptacle to the flange. Further, while the electrical receptacle is illustrated as a duplex power receptacle, it will be appreciated the that receptacle can take numerous other forms, such as a data connector, a coaxial connector, or a simplex electrical receptacle. Additionally, while one receptacle is shown it will be appreciated that the cover assembly could be modified to accommodate multiple receptacles.

The access door mounting member 14 is connectable to the trim flange 12 by a plurality of threaded fasteners 30 that pass through apertures 32 in the mounting member 14 and thread into reciprocal apertures in the trim flange 12. The top of the trim flange 14 presents a recessed portion 36 that is sized and configured to receive the mounting member 14, such that the top of the mounting member is generally flush with the top of the trim flange.

The mounting member 14 includes an access opening 37 that aligns with the opening 22 in the trim flange to provide access to the receptacle 24. First and second access doors 38, 40 are connected to the mounting member 14 for movement between closed positions (see FIG. 1) at which the access doors are adjacent one another and overlie the at least one receptacle and open positions (see door 38 in FIG. 4) at which the access doors are spaced from one another and the at least one receptacle is exposed. Put another way, the access doors are movable between open positions at which the access opening 37 in the mounting maker 14 is exposed (open) and closed positions at which the access opening 37 is covered (closed). When the receptacle comprises a duplex receptacle, as shown, each access door is preferably associated with one of the outlets 42 (one shown) in the receptacle. Each of the access doors 38, 40 is movable between closed position (see, e.g., the door 40 in FIGS. 3 and 4) at which it overlies the associated outlet 42 and an open position (see, e.g., the door 38 in FIG. 4) at which the associated outlet is exposed.

The cover assembly 10 has been designed to pass the scrub water requirements set forth by Underwriters Laboratories. For this purpose, the cover assembly 10 incorporates a series of three separate sealing members to seal against moisture infiltration through the cover assembly and into the fitting. The first seal 16 is provided to seal against water infiltration through between the access doors when the doors are at their closed position. The second seal member 18 seals between the door mounting member 14 and the flange 12. The second seal may also include features to further seal against water infiltration through the access doors. The third seal member 20 seals against water infiltration between the trim flange 12 and the floor.

According to one embodiment, the first seal member 16 comprises at least one compressible seal member 42 carried by at least one of the access doors 38, 40 (see FIG. B). Preferably, the compressible seal member 42 comprises a pair of compressible seal members 42, where each of the compressible seal member is carried by a different one of the access doors 38, 40. The compressible seal members 42 are positioned on the inner edges 44 of the access doors 38, 40 so that they abut and compress against one another when the doors are moved to their closed positions. The seal members 42 may be in the form of compressible gaskets that are secured to the doors 38, 40, e.g., by adhesives. Alternatively, the compressible seals may comprise a compressible polymer that is co-molded with the access doors.

In another embodiment, the first seal member may be in the form of a magnetic seal member 44 carried by at least one of the doors. Preferably magnetic seal members 44 are carried by each of the access doors 38, 40. The magnetic seal members 44 may be in the form of magnetic strips that are affixed to the doors, e.g., by adhesives. The magnetic seal members 44 are positioned on the access doors 38 40 to magnetically engage with one another when the access doors are at their closed position so as to seal against moisture infiltration between the doors. Alternatively, one of the access doors 38, 40 can carry a magnetic seal member 42 and the other door can carry a metallic strip such that when the doors are moved to their closed position, the magnetic seal member magnetically adheres to the metal strip to seal between the access doors.

While the cover assembly is shown with two doors, it will be appreciated that a single door can be used in some applications. In such an embodiment, the first seal member 16 seals between the access door and a feature, such as a wall or flange, on the door mounting member 14. For example, with reference to FIG. 3, a structure similar to that of the closed door 40 could be integrally formed with the mounting member 14. Compressible seals positioned on this structure and/or the door 38 seal around the door 38 when it is closed. Further, where more than one receptacle is present, separate doors (or pairs of doors) can be provided for each receptacle.

The second seal member 18 is interposed between the mounting member 14 and the trim flange 12 for sealing against water infiltration between the mounting member and the trim flange. According to one embodiment, the second seal member comprises compressible gasket having a generally planar portion 50 that is compressed between the mounting member 14 and the trim flange 12. An access opening 52 in the second seal member aligns with the receptacle 24 and provides access thereto. A upwardly extending rib 54 or flange is formed around the perimeter of the access opening 52 and being positioned to abut with the access doors 38, 40 when the access doors are at their closed positions so as to seal against water infiltration between the rib and the doors. Further, the rib 54 is preferably constructed to form a tight fit with the outer periphery of the receptacle 24 to further seal against moisture infiltration between the receptacle housing and the seal. As will be appreciated, the construction of the second seal member can be varied to accommodate different types and numbers of receptacles. For example, separate opening could be provided for each outlet in the receptacle. Similarly, where multiple receptacles as are provided, the second seal 18 can include separate openings for each receptacle.

The third seal member 20 is interposed between the trim flange 12 and a floor surface for sealing against water infiltration between said the trim flange and the floor surface and into the in-floor fitting. In the illustrated embodiment, the third seal comprises at least one gasket which is adapted to be compressed between the trim flange and an upper surface of the floor when the trim flange connected to the fitting.

In the embodiment of FIGS. 1-8, the cover doors 38, 40 are pivotally connected to the door mounting member for movement between their open and closed positions. The doors 38, 40 can be pivoted between a closed position at which they overlie the receptacle 24 and an open position at which at least a portion of the receptacle is exposed and accessible. As can best be seen in FIG. 7, the pivot connection is made through hinge pins 56. The pins 56 pass through openings 60 in the side of the mounting member 14 and through reciprocal openings 62 in the access doors. The pin 56 is sized to form a press fit with at least one of the openings 60 in the mounting member 14 to secure the pin to the mounting member, whereas the opening 62 in the access door 38, 40 is sized to freely rotate about the hinge pin 56. Advantageously, the pivot points for the doors 38, 40 are located adjacent to but beyond the distal ends of the access opening 37. This construction allows the entire access opening 37 to be exposed when the both of the access doors are open. This construction results in an open system that allows a variety of receptacles, such as duplex, GFI, and Twist-Lock receptacles, to be used in the same cover.

Figure 3:
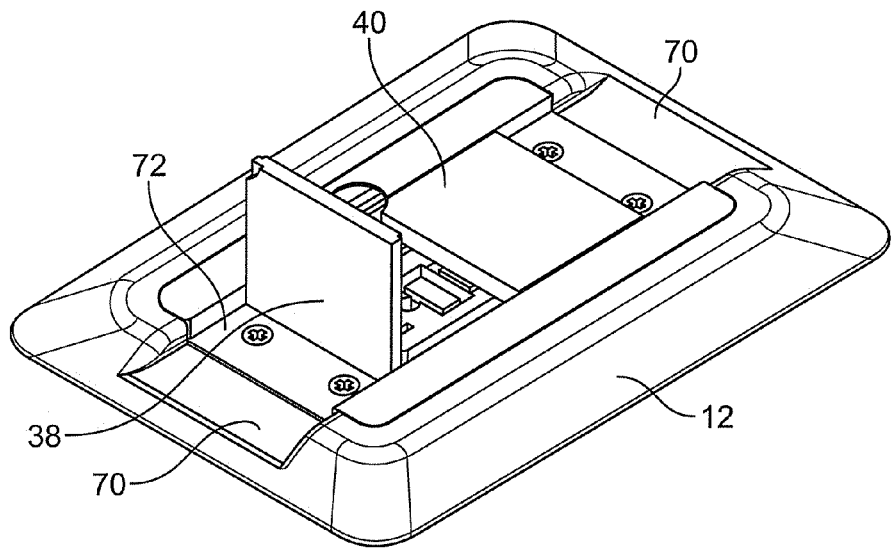
Figure 4:
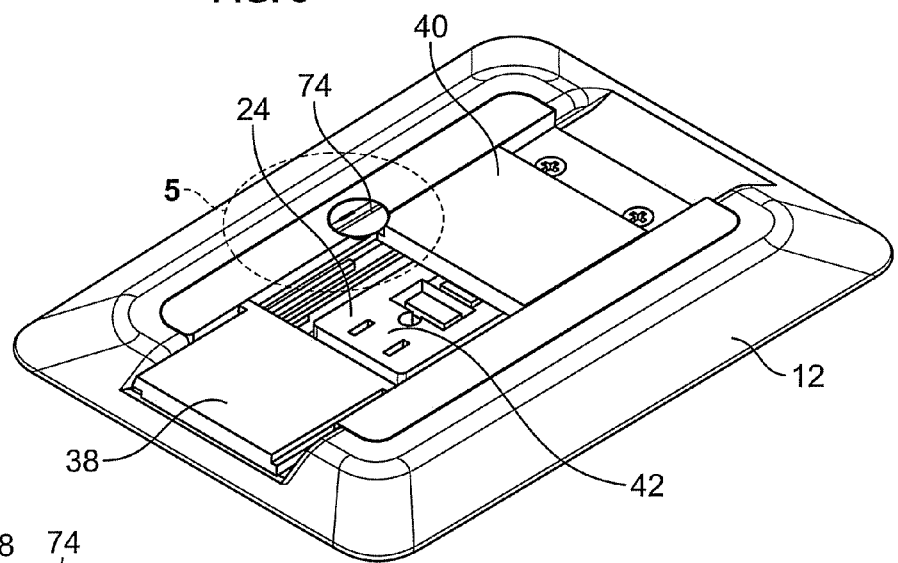

As is shown in FIGS. 3 and 4, for example, the trim flange 12 and the mounting member 14 include recessed portions 70, 72 that are sized to receive the doors 38, 40 when the doors are moved to their open position. Advantageously, the doors 38, 40 are generally flush with the top of the flange 12 when they are in either their open or closed positions. This prevents the doors from being damaged, e.g., by being accidentally kicked. Further, the components are sized so that the doors 38, 40 do not extend beyond the outer periphery of the flange 12 when they are moved to their open positions. This construction also protects the doors from being damaged when they are in their open positions.

Figure 5:
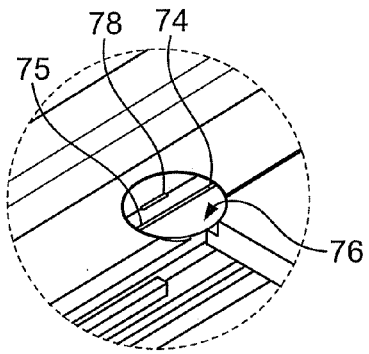

The cover assembly 10 may include a locking mechanism for releasably locking the access doors 38, 40 at their open and closed positions. According to one embodiment, the locking mechanism comprises at least one locking screw 74 carried by the mounting member 14. The locking screw 74 can be rotated between a first position at which the doors 38, 40 are movable between their open and closed positions and a second position which restricts movement of the access doors between their open and closed positions. More specifically, as shown in FIGS. 4 and 5, the head 75 of screw 74 has a rounded edge or portion 76 and a squared-off edge or portion 78. When the rounded portion 76 is aligned with the door(s) (as shown in connection with the door 40 in FIG. 4), the head 75 overlies the door and prevents it from pivoting upwardly towards its open position. To open or close either door 38, 40, the screw 74 is rotated 180 degrees such that the squared-off edge 78 is adjacent to the doors. In this position, the doors can be moved between their closed and open positions.

Figure 6:
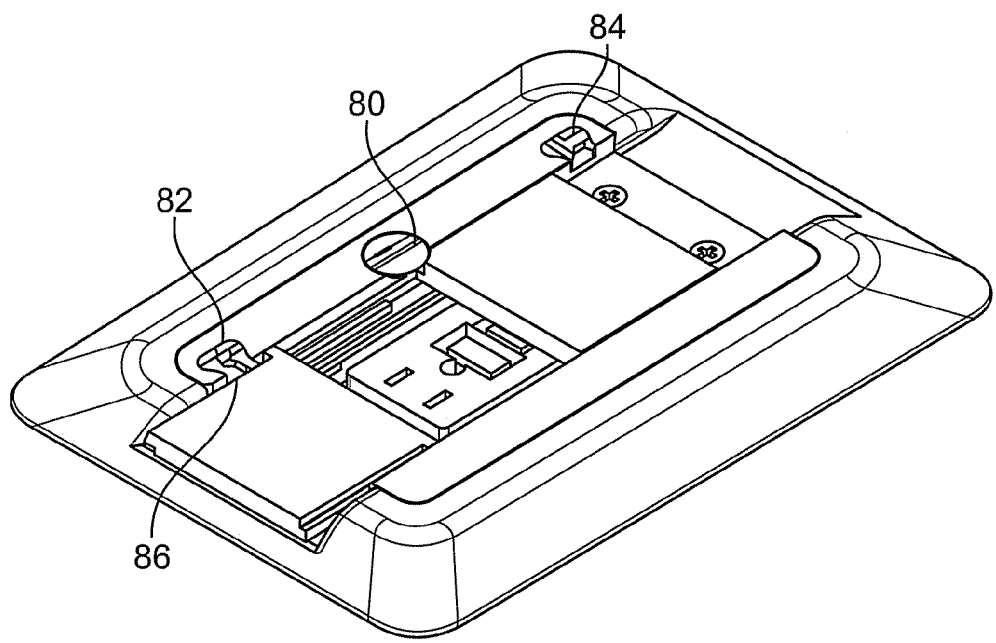
Figure 7:
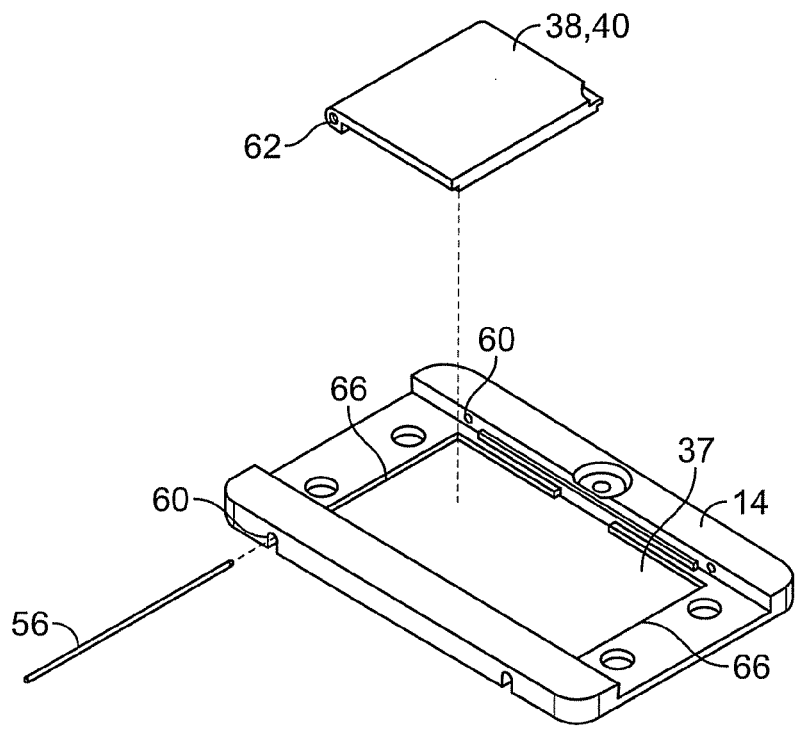
Figure 10:
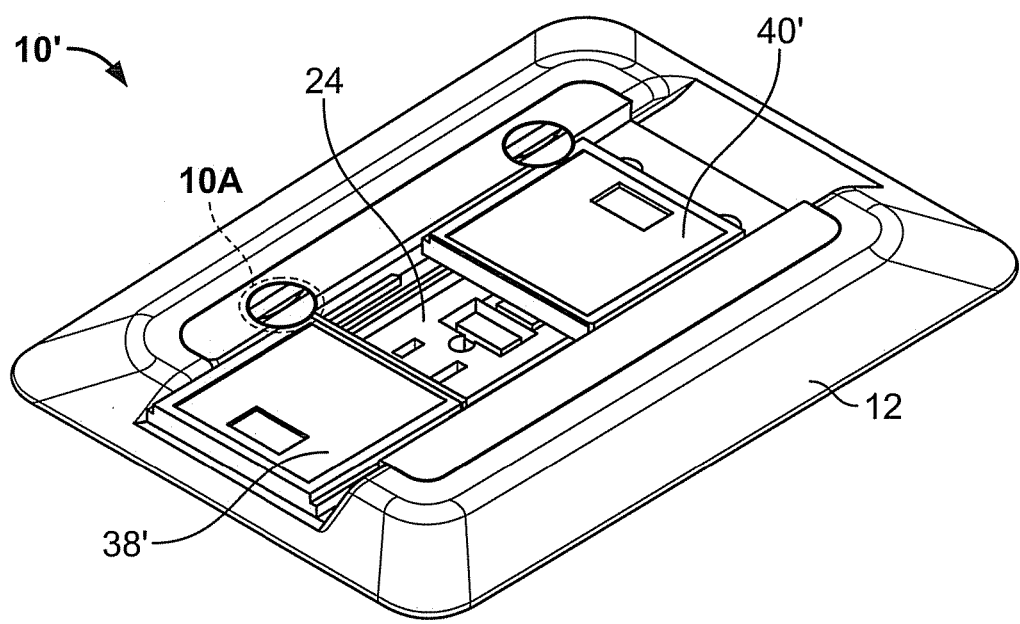
Figure 10A:
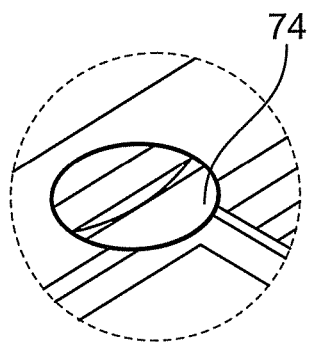
Figure 11:
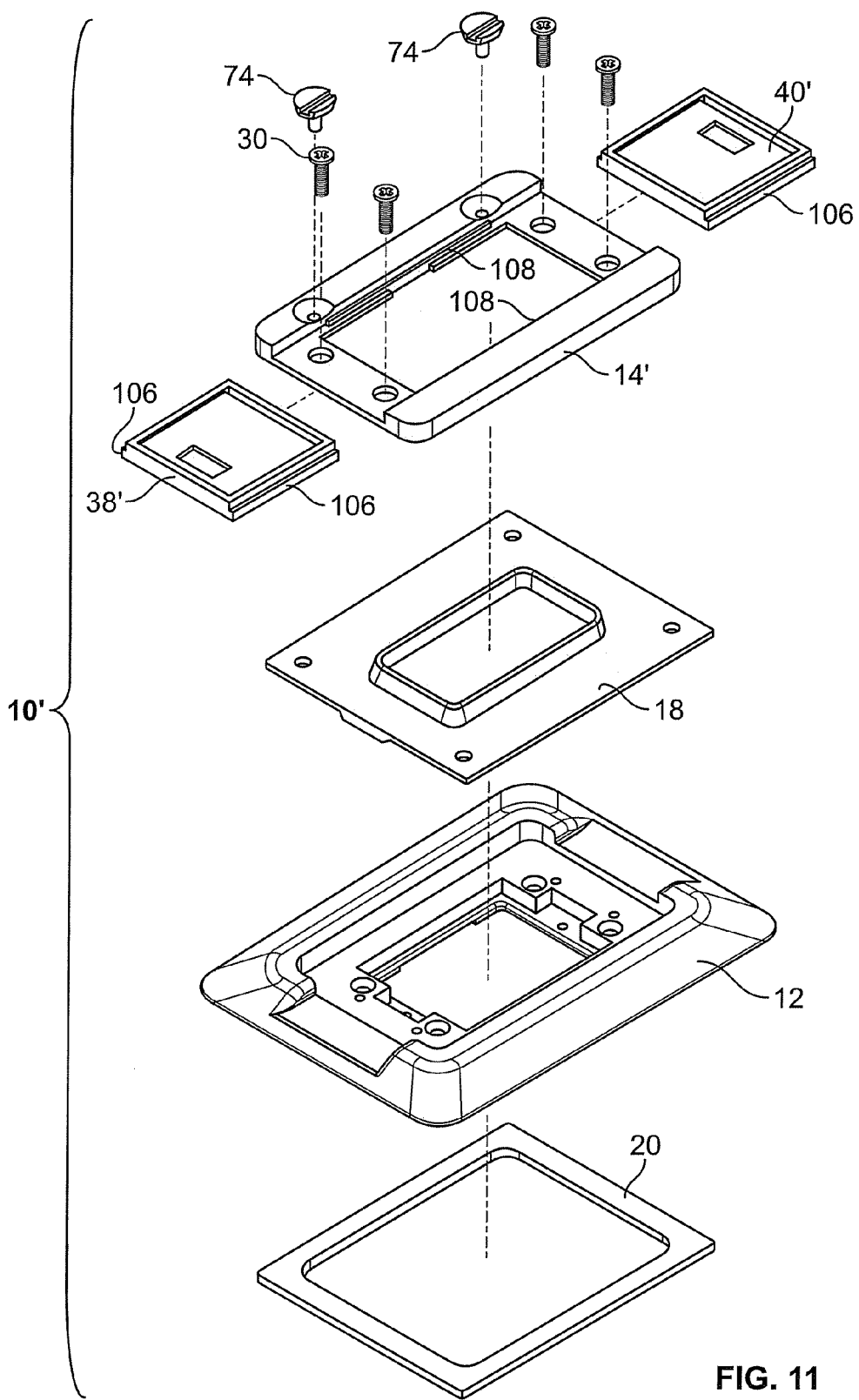

FIG. 6 shows an alternative locking mechanism that employs three locking screws 80, 82, 84. In this embodiment, the central screw 80 is used to lock both doors 38, 40 in their closed positions and each of the outer screws 82, 84 is used to lock one of the access doors in its open position. The screws 80-84 may all have the same general construction as the screw 74 described above. Alternatively, some or all of the screws may use an alternative construction where the screw head includes a tab 86 that can be moved between a first or blocking position, at which the tab overlies the door opening in the mounting member and a second position at which the tab does not overlie the door opening. In FIG. 6, the outer screws 82, 84 employ this alternate construction. It will be appreciated that numerous other means may be used to restrict movement of the doors. For example, the mounting member 14 or the doors 38, 40 could includes integral locking fingers that mate with reciprocal features in the other component.

The first embodiment described above offers several advantages. First, the flip doors 28, 40 are protected by the trim flange 12 when the doors are in both their open and closed positions. This prevents the doors from being accidentally kicked off. Second, this design provides an "open" system which allows the cover assembly to be used with a wide variety of power and data receptacles. Third, it has clearance to allow for plugs of many sizes and shapes to full seat with the face of the receptacle making end use safer and more reliable.

Preferably, the trim flange 12, door mounting member 14 and the access doors 38, 40 are constructed from aluminum. Alternatively, any or all of these components can be constructed from any other suitable material, such as other metals or plastic. Further, while the cover assembly 10 has been illustrated with a duplex power receptacle, it will be appreciated that the cover assembly can be used with a variety of power and communication receptacles.

FIGS. 9-12 illustrate certain aspects of a cover assembly 10' according to a second embodiment of the present invention. The first and second embodiments employ many of the same/similar components. Therefore the like reference numbers have been used to designate like components in the first and second embodiments. The primary difference from the first embodiment, is that the second embodiment utilizes access doors 38', 40' that are slidably connected to the mounting member 14'. Each door 38', 40' slides between an inner, closed position (see, e.g., FIG. 9) and an outer, open position (see, e.g., door 38' in FIG. 10). When a door is at its closed position, it overlies and protects at least a portion of a receptacle carried by the fitting. The door can be slid outwardly to its open position to expose at least a portion of the receptacle.

Figure 12:
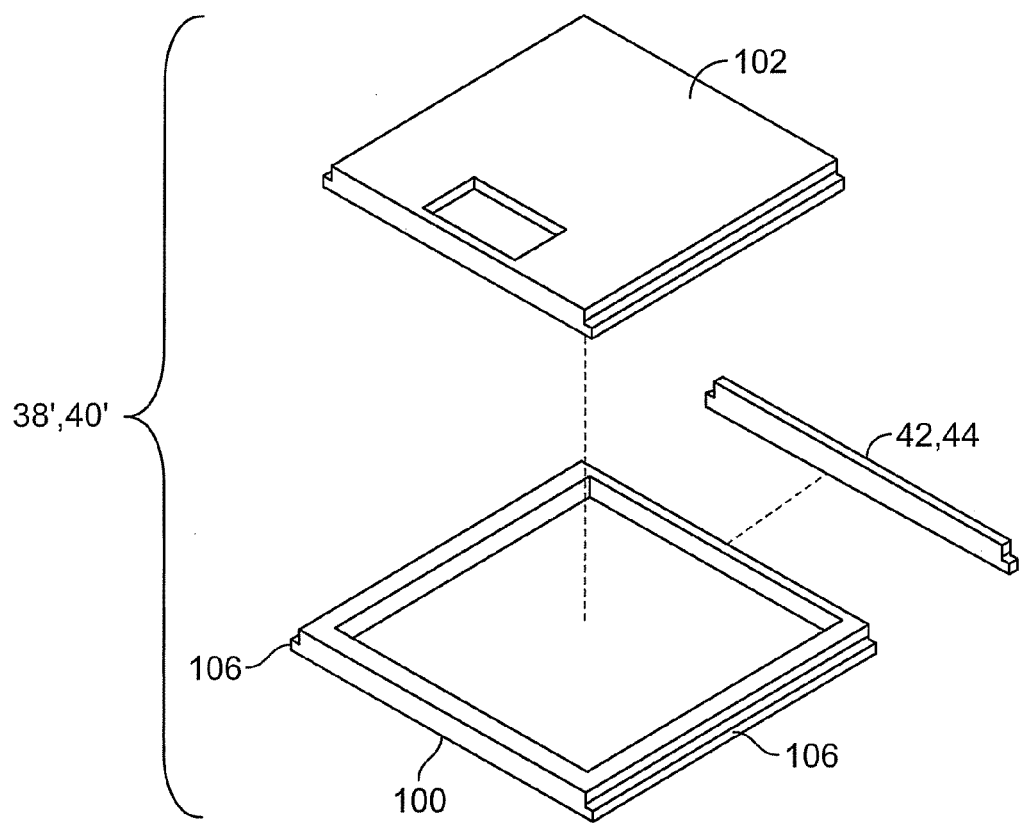
Figure 13:
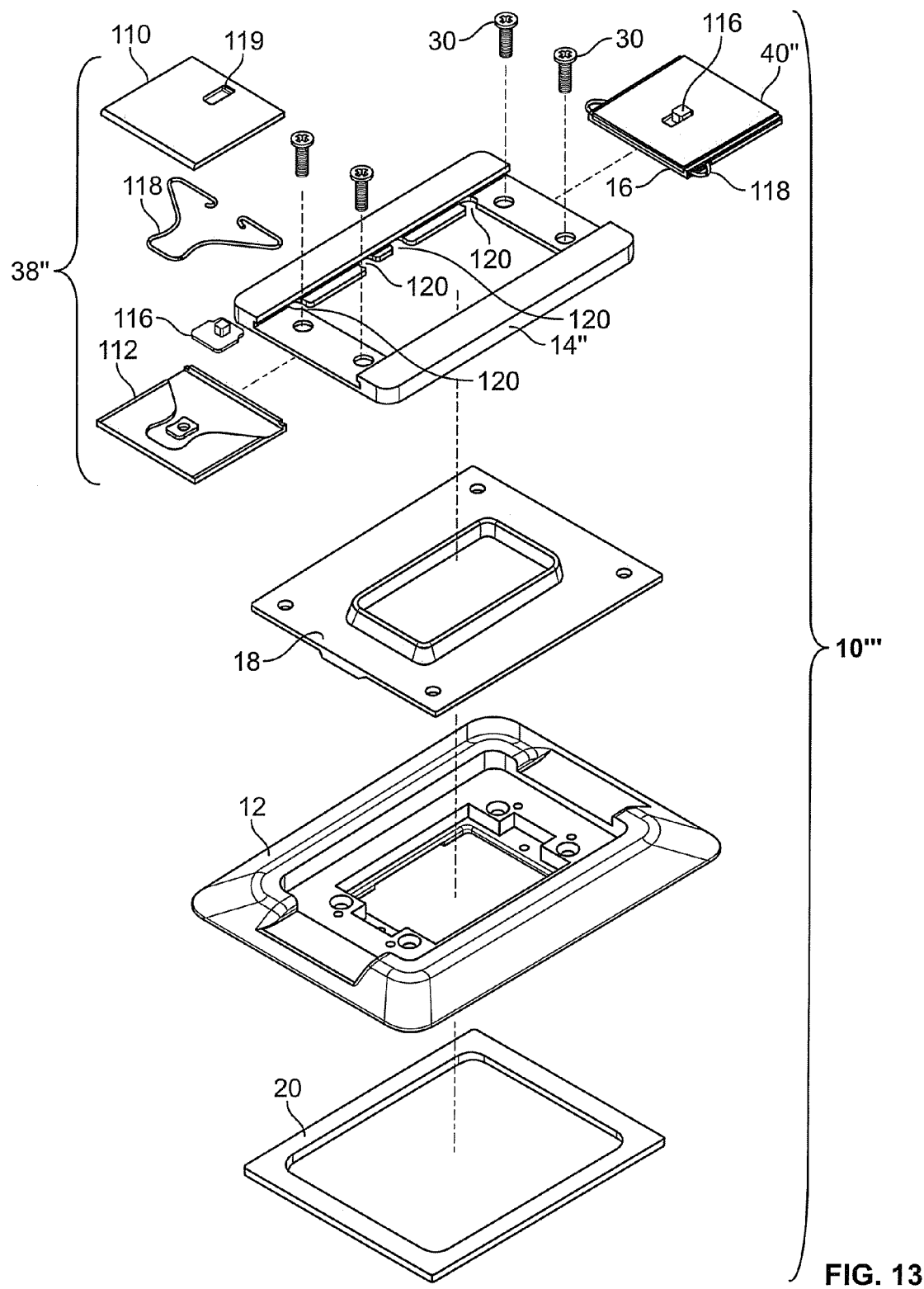
FIGS. 13 through 19 illustrate certain aspects of a cover assembly according to a third embodiment of the present invention.
Figure 14:
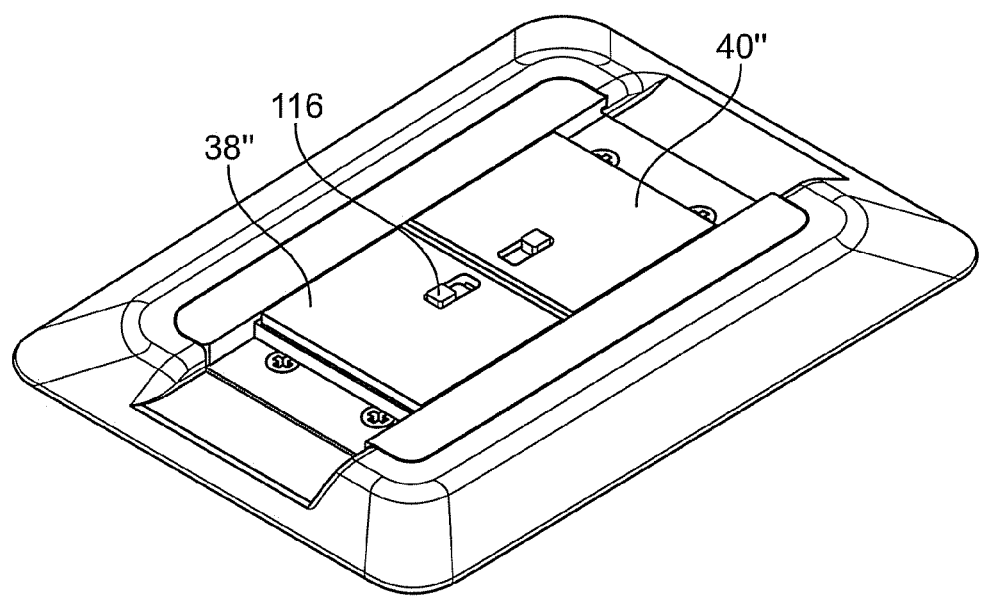
Figure 15:
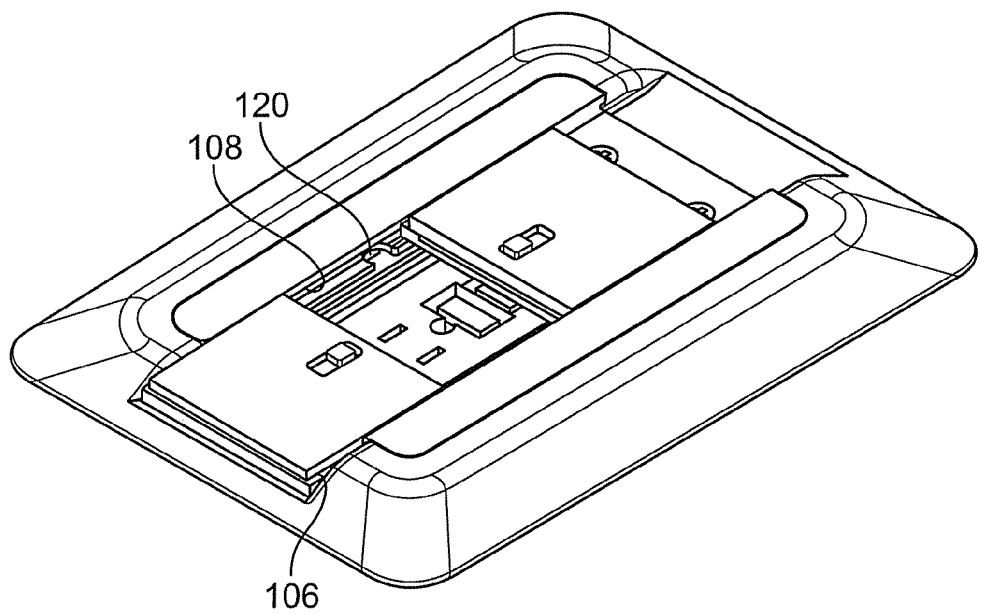
Figure 16:
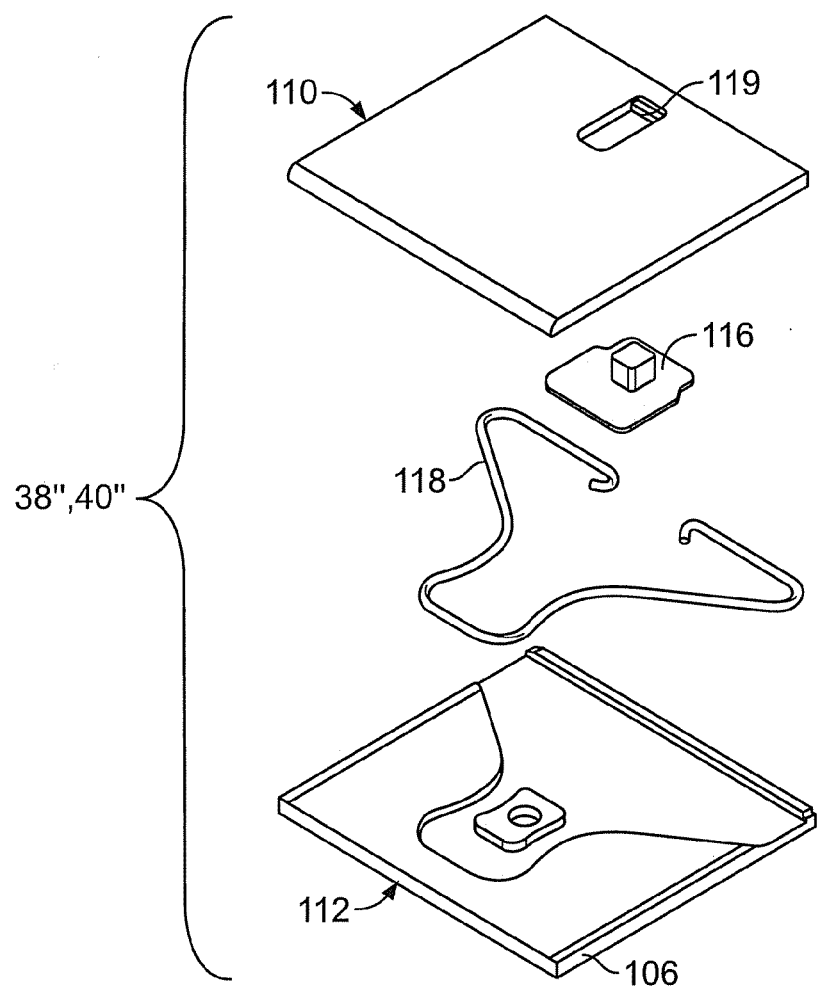
Figure 17:
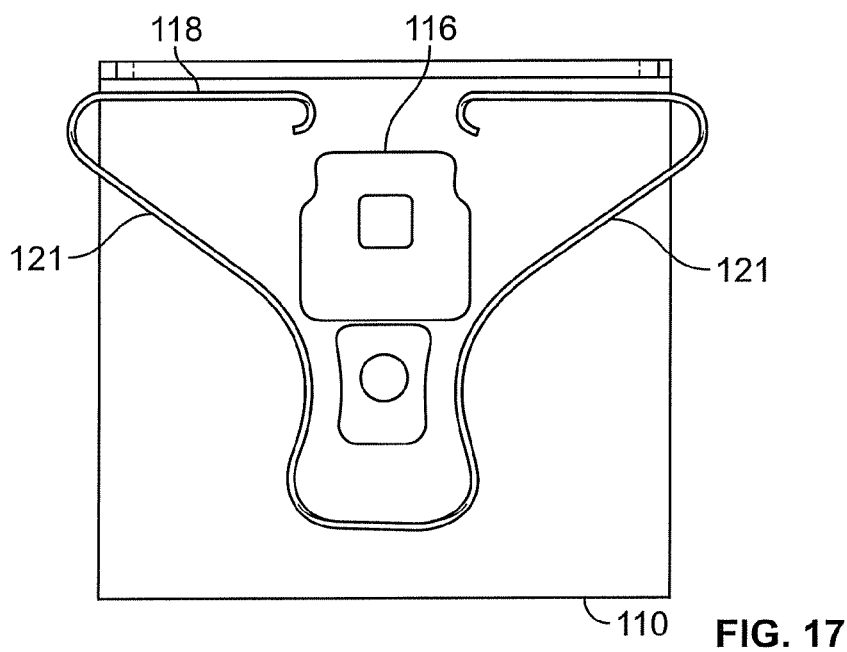

The access doors 38', 40' may use a two-piece construction as is shown in greater detail in FIG. 12. In this regard, each door 38', 40' includes bottom portion 100 and a top portion 102. Preferably, the bottom portion 100 is constructed of plastic, whereas the top portion 102 is constructed of metal (e.g., aluminum) or plastic. The plastic bottom portion 100 insulates the receptacle from the metallic top portion 102. The two-piece design also helps the door to slide because there is less friction between plastic bottom portion 102 of the door and the door mounting member 14 (which is preferably metallic). Moreover, when the two-piece door is used, the first seal member 16 can be in the form of a gasket that is compression fit between the top and bottom portions of the slide door. Alternatively, the door could be a single piece formed from plastic, for example.

The access doors 38', 40' are configured to slidably mate with the door mounting member 14'. For this purpose, the doors include outwardly extending flanges 106 that mate with reciprocal tracks 108 formed in the mounting member 14. The flanges include features, such as beveled protrusions (not shown), that retain the doors 38', 40' within the mounting member 12'. The doors 38', 40' are installed in the mounting member 12' by aligning the flanges 106 with the tracks 108. As the doors 38', 40' are slid into the tracks 108, the beveled protrusions move past the outer ends of the tracks 108, thereby locking the door 38', 40' into the tracks 108.

Some prior cover assemblies have slide doors with apertures that align with the apertures in the receptacle outlet when the door is slid to its "open" position. In these designs, the blades of a plug to pass through the apertures in the access door and into the receptacle. By contrast, in the embodiment shown in FIGS. 9-12, the access doors 38', 40' slide completely out of the way of the receptacle and allow for the plug to fully seat on the face of the receptacle. This design is beneficial because it allows the use either metal or plastic on the top half of the slide door cover. This design also allows the cover to be used with a wide variety of receptacle designs.

The cover includes two locking screws 74 similar to those described above. The doors 38', 40' cannot be moved as long as the locking screws are in their closed positions, i.e., with the rounded portion of the screw head facing towards the inside of the mounting member 14' (see FIG. 9). In order to move the door, the screw is rotated 180 degrees to allow the door to slide within the mounting member 14. The door is then locked in position (open or closed) by rotating the screw head 180 degrees so that the rounded portion 76 of the screw head 75 engages against the door to hold it in position. It should be noted that when a door is locked in its open position it still may be possible to accidentally kick the door shut, but it would take a much larger force to do so.

Figure 18:
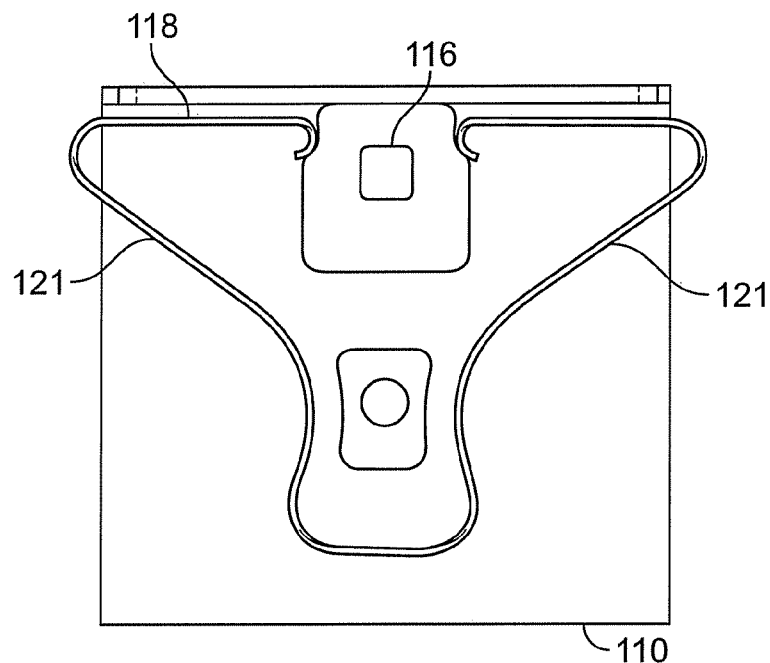
Figure 19:
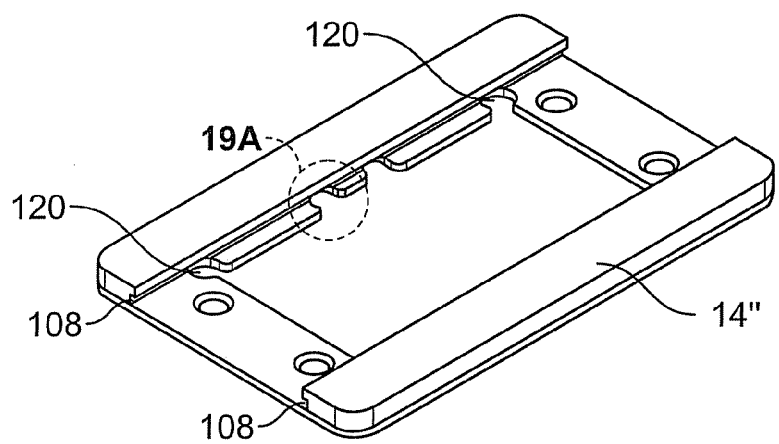
Figure 19A:
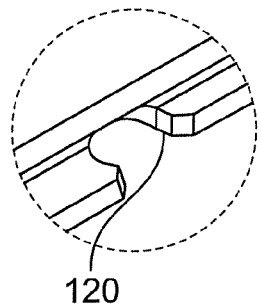

FIGS. 13 through 19 illustrate a cover assembly 10" according to a third embodiment of the present invention. Again, like components are designated with like reference numbers. This third embodiment uses slide doors 38", 40" with a multi-piece construction. Each door 38", 40" includes a top portion 110, a bottom portion 112, a button 116 and a spring 118. The button 116 and the spring 118 are sandwiched (e.g. laminated) between the top and bottom portions 110, 112. The button is accessible through an opening 119 in the top portion 110. Preferably the bottom portion 112 is formed of plastic, whereas the top portion 112 is formed of metal or plastic. When assembled the spring 118 interfaces with features (e.g., cutouts 120) formed on the inside of the door mounting member 14". The button is movable between a first position (see FIG. 17) and a second position (see FIG. 18). When the button 116 is at its first position, the legs 121 of the spring 118 can flex inwardly and retract into the body of a respective door 38", 40". When the button 116 is at its second position (FIG. 18) it blocks inward flexing of the spring's legs 121. When the button 116 is at its first position, the spring 118 is given clearance (FIG. 17) to compress inwardly as the door is moved away from the center of the assembly. The door is slid outwardly until the spring 118 seats into a second set of cutouts that are spaced outwardly from the center of the opening in the mounting member 14". The doors are closed in a similar manner. The door 38", 40" can be locked in its open or closed positions by moving the button to its second position, at which the button restricts inward movement of the spring 118, as shown in FIG. 18.

The doors 38", 40" can be mounted in the mounting member 14" in the manner described above in connection with the second embodiment. Specifically the doors 38", 40" may include flanges 106 that mate with tracks 108 in the mounting member 14". Alternatively or additionally, the spring 118 can be captured by the tracks 108 to slidably connect the door to the mounting member 14". The sealing of this cover assembly is similar to the previous assemblies, and, hence, the details are described further.

Figure 20:
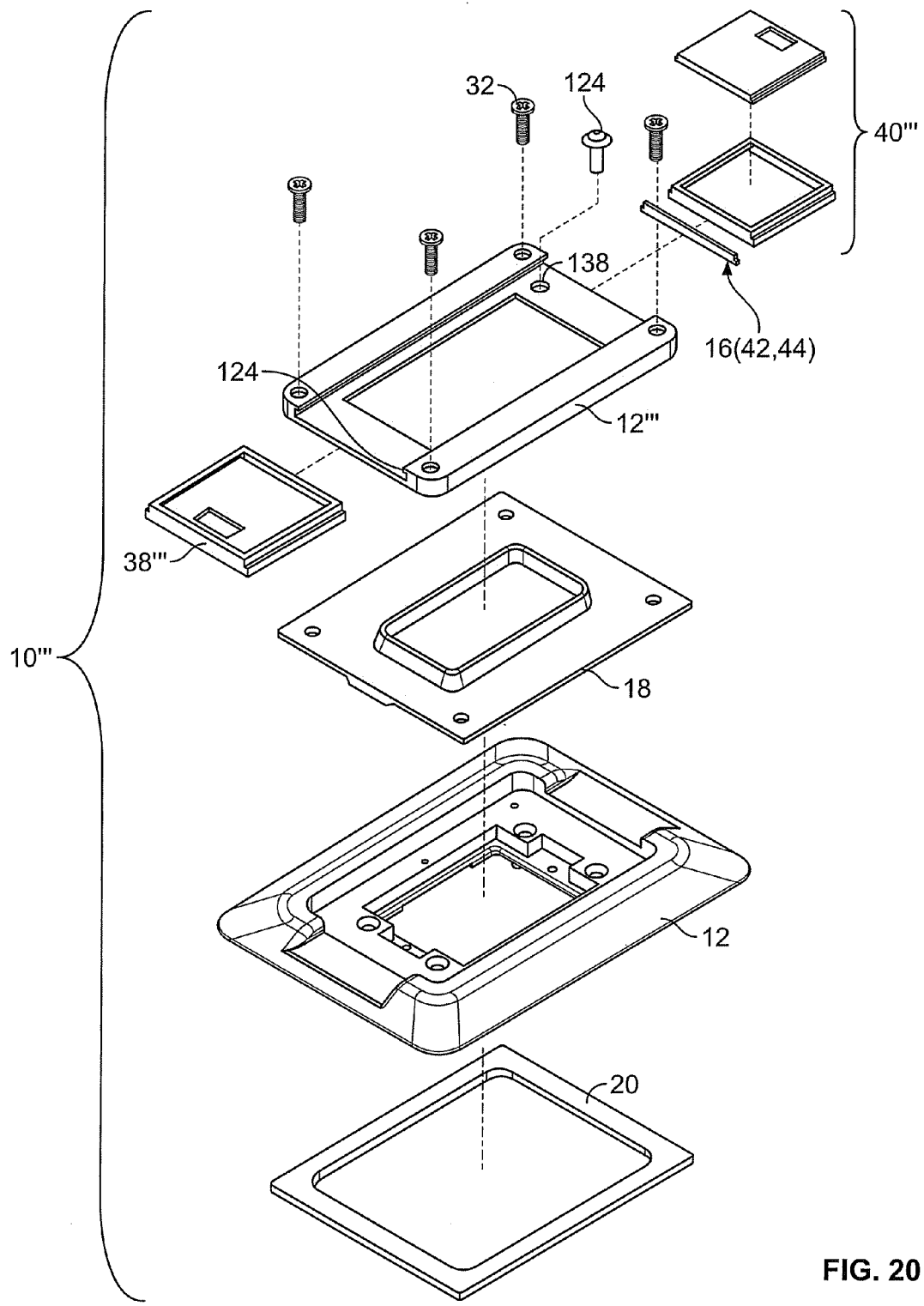
FIGS. 20 through 22 illustrate certain aspects of a cover assembly according to a fourth embodiment of the present invention.
Figure 21:
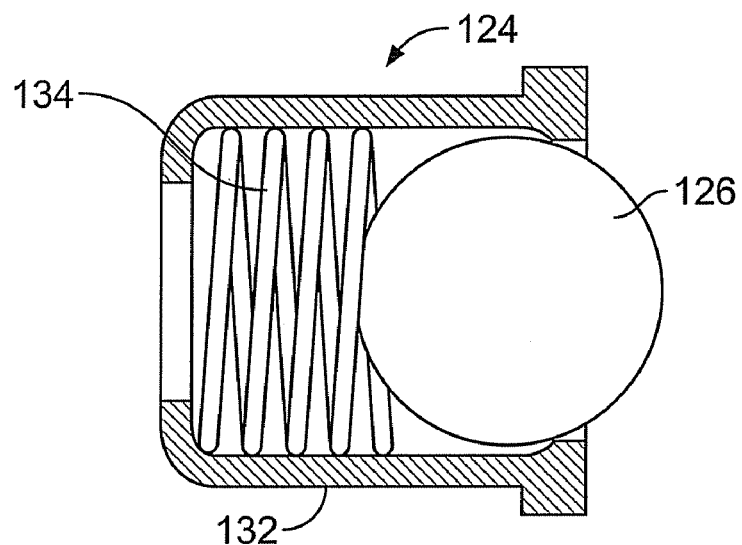
Figure 22:
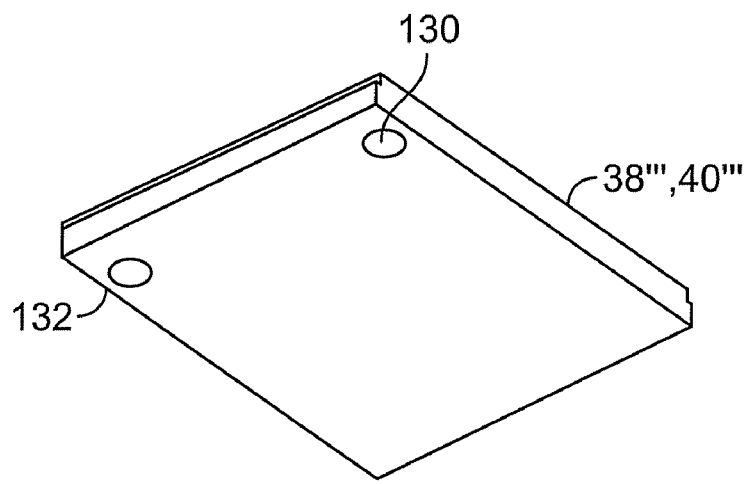

FIGS. 20 through 22 illustrate a fourth embodiment of the present invention. This embodiment is similar to the second, except in the construction of the mechanism that is employed to releasably lock the doors 38''', 40''' in their open and closed positions. In this embodiment, the locking mechanism comprises ball plungers 124 associated with each of the doors 38''', 40'''. Each ball plunger 124 includes a ball member 126 which interfaces with a surface of a respective access door 38''', 40''' to releasably lock the associated door at its open and closed positions. The ball plungers 12 may be mounted in an upper surface of the access door mounting member 12'''. Each door has an inner recess (dimple) 130 and an outer recess 132 (see FIG. 22) in its bottom face that align with the ball plunger 124 when the door is in its open and closed positions, respectively. The ball 126 moves into these recesses 130, 132 to releasably lock the door in its open and closed positions. Alternatively, each door could be provided with multiple ball plungers. For example, plungers could be placed on opposite sides or ends of the doors.

The ball plunger is shown in greater detail in FIG. 21. The ball 126 is held within a metal or plastic sleeve 133 along with a spring 134. The ball 126 can be made of either plastic or metal as well. As the ball 126 is pushed down, the spring 134 resists causing the necessary force to lock the door into place when the ball enters a specified detent (stop) region 130, 132 in the bottom face of the door. The spring 134 can be made specific to the desired force for any application. For example, in one presently contemplated application, the force is set in a range, 4 to 7 pounds of force for example, so that a person can pull the door open with no special tools or assistance. The ball plunger 124 may be press fit into reciprocal apertures 138 in the top of the mounting member. Alternatively some ball plungers have a threaded sleeve so they can be screwed into place during installation. The remaining components of this embodiment are similar to those previously described and therefore will not be described in greater detail.

While the invention has been described with reference to certain preferred embodiments, it will be understood by those skilled in the art that various changes may be made and equivalents may be substituted without departing from the scope of the invention. In addition, many modifications may be made to adapt a particular situation or material to the teachings of the invention without departing from its scope. For example, the covers have been described as being constructed from certain presently preferred materials. It will be appreciated, however, that a wide variety of materials (including a variety of metals and plastics) may be used to construct the various components of the covers.

What is claimed:

1. A cover assembly for an in-floor receptacle fitting of the type configured to support at least one electrical receptacle, comprising:

a trim flange connectable to the fitting, the trim flange having an opening that overlies the fitting and provides access to the at least one electrical receptacle;

an access door mounting member connectable to the trim flange, the access door mounting member having an opening that overlies the opening in the trim flange;

first and second access doors connected to the access door mounting member for movement between closed positions at which the access doors are adjacent one another and overlie the at least one receptacle and open positions at which the access doors are spaced from one another and the at least one receptacle is exposed;

a first seal member adapted to seal against moisture infiltration between the access doors when the access doors are at their closed positions;

a second seal member interposed between the mounting member and the trim flange to seal against water infiltration between the mounting member and the trim flange; and a third seal member interposed between the trim flange and a floor surface to seal against water infiltration between the trim flange and the floor surface, wherein said first, second and third seal members are separate and distinct from one another.

2. The cover assembly as set forth in claim 1, wherein the at least one electrical receptacle comprises a power receptacle having first and second outlets and wherein each of the access doors is associated with one of the outlets, each access door being movable between an closed position at which it overlies the associated outlet and an open position at which the associated outlet is exposed.

3. The cover assembly as set forth in claim 1, wherein the access doors are pivotally connected to the mounting member.

4. The cover assembly as set forth in claim 1, wherein the access doors are slidably connected to the mounting member.

5. The cover assembly as set forth 1, further comprising locking mechanism adapted to releasably lock the access doors at their open and closed positions.

6. The cover assembly as set forth in claim 5, wherein the locking mechanism comprises at least one locking screw carried by the access door mounting member, the locking screw being movable between a first position at which the doors are movable between their open and closed positions and a second position which restricts movement of the access doors between their open and closed positions.

7. The cover assembly as set forth in claim 5, wherein the locking mechanism comprises first and second ball plungers associated with the first and second doors, respectively, each ball plunger including a ball member which interfaces with a surface of a respective access door to releasably lock the associated door at its open and closed positions.

8. The cover assembly as set forth in claim 7, wherein the ball plungers are mounted in a surface of the access door mounting member.

9. The cover assembly as set forth in claim 5, wherein the locking mechanism comprises first and second spring members associated with the first and second doors, respectively.

10. The cover assembly as set forth in claim 9, wherein the first and second springs are carried by the first and second doors, respectively, the springs being configured to releasably mate with reciprocal features in the mounting member for releasably locking the doors at their open and closed positions.

11. The cover assembly as set forth in claim 1, wherein the first seal member comprises at least one compressible seal carried by at least one of the access doors.

12. The cover assembly as set forth in claim 1, wherein the first seal member comprises a pair of compressible seal members, each of the compressible seal members being carried by one of the access doors, the compressible seal members being positioned to abut one another when the access doors are at their closed positions so as to seal against moisture infiltration between the access doors.

13. An access cover as set forth in claim 12, where in the compressible seal members comprise a compressible polymer that is co-molded with the access doors.

14. An access cover as set forth in claim 1, wherein the first seal member comprises at least one magnetic seal member.

15. An access cover as set forth in claim 14, wherein the magnetic seal member comprises first and second magnetic seal members, each of the magnetic seal members being carried by one of the access doors, the magnetic seal member being positioned to magnetically engage with one another when the access doors are at their closed position so as to seal between the access doors.

16. A cover assembly as set forth in claim 1, wherein the second seal member comprises a generally planar portion that is compressed between the mounting member and the trim flange, the seal member having an access opening which provides access to the at least one receptacle and upwardly extending rib formed around the perimeter of the access opening and being positioned to abut with the access doors when the access doors are at their closed positions so as to seal against water infiltration between the rib and the doors.

17. A cover assembly as set forth in claim 1, wherein the third seal member comprises at least one gasket which is adapted to be compressed between the trim flange and an upper surface of the floor when the trim flange connected to the fitting.

18. A cover assembly as set forth in claim 1, wherein the access opening has in the mounting member is generally rectangular and includes first and second ends, and wherein the first and second doors are pivotally connected to the mounting member at locations distally adjacent the first and second ends of the access opening, respectively.

19. A cover assembly as set forth in claim 1, wherein the opening of the trim flange is configured to support the at least one receptacle.

20. A cover assembly as set forth in claim 19, wherein the electrical receptacle comprises a duplex power receptacle having first and second outlets.

21. A cover assembly for an in-floor electrical fitting, comprising:
a trim flange secured to the fitting, the trim flange having an opening that overlies the fitting and supports at least one electrical receptacle;
an access door mounting member secured to the trim flange, the access door mounting member having an opening that overlies the opening in the trim flange and provides access to the at least one electrical receptacle;
first and second access doors movably connected to the access door mounting member, each access door being movable between a closed position at which it overlies a portion of the electrical receptacle and a second position at which the respective portion of the electrical receptacle is exposed and accessible through the opening;
a first seal member adapted to seal against moisture infiltration between the access doors when the access doors are at their closed positions;
a second seal member interposed between the mounting member and the trim flange to seal against water infiltration between the mounting member and the trim flange; and
a third seal member interposed between the trim flange and a floor surface to seal against water infiltration between the trim flange and the floor surface, wherein the first, second and third seal members are separate and distinct from one another.

22. The cover assembly as set forth in claim 21, wherein the access doors are pivotally connected to the mounting member.

23. The cover assembly as set forth in claim 21, wherein the access doors are slidably connected to the mounting member.

24. A cover assembly for an in-floor electrical fitting, comprising:
a trim flange secured to the fitting, the trim flange having an opening that supports a power receptacle having first and second outlets;
an access door mounting member secured to the trim flange, the access door mounting member having an opening that overlies the power receptacle to provide access to the outlets;
first and second access doors movably connected to the access door mounting member, each access door being movable between a closed position at which it overlies a respective one of the first and second outlets and a second position at which a respective one of said first and second outlets is exposed and accessible through the opening in the mounting member;
a first seal member adapted to seal against moisture infiltration between the access doors when the access doors are at their closed positions;
a second seal member interposed between the mounting member and the trim flange, to seal against water infiltration between the mounting member and the trim flange; and
a third seal member interposed between the trim flange and a floor surface to seal against water infiltration between the trim flange and the floor surface, wherein the first, second and third seal members are separate and distinct from one another.

25. A cover assembly for an in-floor fitting, comprising:
a trim flange connectable to the fitting, the trim flange having an opening that provides access to an interior compartment of the in-floor fitting;
an access door mounting member connectable to the fitting, the access door mounting member having an opening that overlies the opening in the trim flange;
an access door movably connected to the mounting member for movement between a closed position at which the door covers the opening in the mounting member and an open position at which the opening in the mounting member is exposed;
a first seal member which seals against moisture infiltration between the access door and the mounting member when the door is at its closed position;
a second seal member which seals against water infiltration between the mounting member and the trim flange; and a third seal member which seals against water infiltration between the trim flange and the floor, wherein the first, second and third seal members are separate and distinct from one another.

26. A cover assembly for an in-floor receptacle fitting of the type configured to support at least one electrical receptacle, comprising:

a trim flange connectable to the fitting, the trim flange having an opening that overlies the fitting and provides access to the at least one electrical receptacle;

an access door mounting member connectable to the trim flange, the access door mounting member having an opening that overlies the opening in the trim flange;

first and second access doors connected to the access door mounting member for movement between closed positions at which the access doors are adjacent one another and overlie the at least one receptacle and open positions at which the access doors are spaced from one another and the at least one receptacle is exposed;

a first seal member adapted to seal against moisture infiltration between the access doors when the access doors are at their closed positions, wherein the first seal member comprises at least one compressible seal carried by at least one of the access doors;

a second seal member interposed between the mounting member and the trim flange to seal against water infiltration between the mounting member and the trim flange; and a third seal member interposed between the trim flange and a floor surface to seal against water infiltration between the trim flange and the floor surface.

27. A cover assembly for an in-floor receptacle fitting of the type configured to support at least one electrical receptacle, comprising:

a trim flange connectable to the fitting, the trim flange having an opening that overlies the fitting and provides access to the at least one electrical receptacle;

an access door mounting member connectable to the trim flange, the access door mounting member having an opening that overlies the opening in the trim flange;

first and second access doors connected to the access door mounting member for movement between closed positions at which the access doors are adjacent one another and overlie the at least one receptacle and open positions at which the access doors are spaced from one another and the at least one receptacle is exposed;

a first seal member adapted to seal against moisture infiltration between the access doors when the access doors are at their closed positions, wherein the first seal member comprises at least one magnetic seal member;

a second seal member interposed between the mounting member and the trim flange to seal against water infiltration between the mounting member and the trim flange; and a third seal member interposed between the trim flange and a floor surface to seal against water infiltration between the trim flange and the floor surface.

* * * * *